W. W. Draper,
Tool Holder.
No. 4,333. Reissued Apr. 11. 1871.
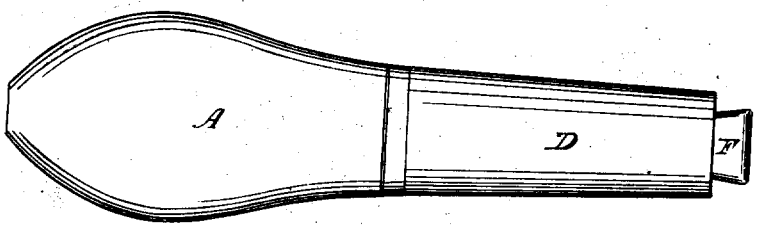
— Fig. 1 —
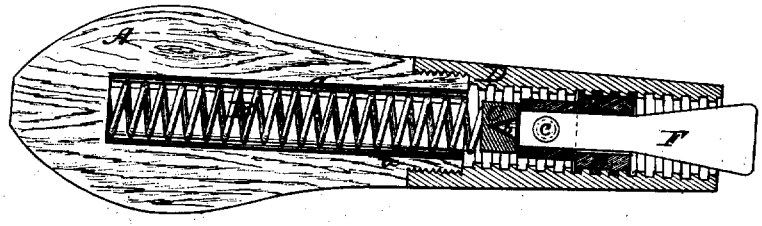
— Fig. 2 —
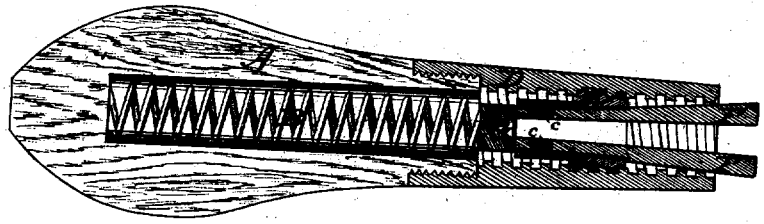
Witnesses: J. P. Crawford, Edw and E. Delieson
— Fig. 3 —
W. W. Draper Inventor
By R. A. Dwyer his Atty
N. PETERS, PHOTO-LITHOGRAPHER, WASHINGTON, D. C.

UNITED STATES PATENT OFFICE.

WILLIAM W. DRAPER, OF GREENFIELD, MASSACHUSETTS.

IMPROVEMENT IN TOOL-HOLDERS.

Specification forming part of Letters Patent No. 22,635, dated January 18, 1859; Reissue No. 4,333, dated April 11, 1871.

*To all whom it may concern:*

Be it known that I, WILLIAM W. DRAPER, of Greenfield, in the county of Franklin and State of Massachusetts, have invented certain new and useful Improvements in Tool-Holders, of which the following is a specification.

My invention is designed as a universal holder for tools of various sizes; and it consists in certain novel combinations and arrangements of parts, which will be fully set forth hereinafter. Its object is to facilitate the use and handling of various tools.

In the drawings, Figure 1 is a view of a tool-holder complete. Fig. 2 is a longitudinal section of the same. Fig. 3 is a longitudinal section taken in a plane at right angles to that of Fig. 2.

Similar letters of reference indicate like parts in all the drawings.

The holder, embracing the parts A B, is provided with a chamber, *a*, to receive a spring, B. One end of this spring rests on the bottom of the chamber, and the other is attached to a centering-block or socket-piece, C, provided with a conical or tapering recess, *b*. On the end of the holder is screwed or otherwise fastened a metallic ferrule, D, provided with an internal screw-thread, and within which a short nut, E, likewise threaded, is arranged to work. This nut E has two jaws, F F, hinged to it by the two pins *c c*, which are constructed and arranged in the manner shown in Figs. 2 and 3 of the drawings.

By hinging the jaws F F, as described, they are enabled to grasp the tangs of tools of various sizes, as they readily adapt themselves to the form of the tang and grasp it throughout its length. The shape of the jaws causes them to close upon the tang inserted between them as they are drawn within the ferrule D by the rotation of the nut E, to which they are hinged, the outer face of each jaw being wedge-shaped, as shown in the drawings. To fasten a tool to this holder the tang is inserted between the jaws F F and pressed down the proper distance against the socket-piece C and into the recess *b*, according to the length of the tang. The holder is then held firmly in one hand, while the tool is turned by the other to cause the nut E to rotate and draw the jaws within the ferrule D; or the tool may be held stationary while the holder is rotated, as it is evident that the jaws may be closed to grasp the tool either by turning the nut E within the ferrule D or revolving the ferrule upon the nut.

The socket-piece *b* and spring C serve to center the tool with respect to the jaws and holder, and enable the tang to be inserted the required distance within the jaws while closing them together. They also act to expel the tool from the holder when the jaws are released.

I am aware of the patents granted to H. Akin, December 27, 1839, D. H. Chamberlain, April 3, 1849, and others for holding awls, in which a split mandril with a screw cut on one end fits a stationary nut in the handle, and I disclaim all such devices.

What I claim as of my invention is—

1. The combination, with the holder embracing the parts A D, of the loose wedge-shaped jaws F F and the revolving nut E for operating the jaws, substantially as described, and for the purposes set forth and specified.

2. The combination, with the holder embraced in the parts A D, jaws F F, and revolving nut E, of the centering-block C and spring B, substantially as described and specified.

WILLIAM W. DRAPER.

Witnesses:

THOS. S. HALL,

CHESTER C. CONANT.